United States Patent
Ryon et al.

(10) Patent No.: US 10,858,997 B2
(45) Date of Patent: Dec. 8, 2020

(54) BRAZING COMPONENTS AND TECHNIQUES

(71) Applicant: Delavan Inc., West Des Moines, IA (US)

(72) Inventors: Jason A. Ryon, Carlisle, IA (US); Lev Alexander Prociw, Johnston, IA (US)

(73) Assignee: Delavan Inc., West Des Moines, IA (US)

( * ) Notice: Subject to any disclaimer, the term of this patent is extended or adjusted under 35 U.S.C. 154(b) by 24 days.

(21) Appl. No.: 16/256,237

(22) Filed: Jan. 24, 2019

(65) Prior Publication Data

US 2019/0153951 A1    May 23, 2019

Related U.S. Application Data

(62) Division of application No. 15/191,120, filed on Jun. 23, 2016, now Pat. No. 10,190,502.

(51) Int. Cl.

| | | |
|---|---|---|
| *B23K 1/00* | (2006.01) | |
| *F02C 7/22* | (2006.01) | |
| *F23R 3/28* | (2006.01) | |
| *B23K 1/18* | (2006.01) | |
| *B23K 101/04* | (2006.01) | |

(52) U.S. Cl.
CPC ............. *F02C 7/22* (2013.01); *B23K 1/0008* (2013.01); *B23K 1/0018* (2013.01); *B23K 1/18* (2013.01); *F23R 3/283* (2013.01); *B23K 2101/04* (2018.08); *F05D 2220/32* (2013.01); (Continued)

(58) Field of Classification Search
CPC ........... F02C 7/22; B23K 1/0008; B23K 1/18; B23K 1/0018; B23K 2101/04; B23K 1/00; B23K 33/00; F23R 3/283; F23R 2900/00017; F23R 2900/00019;
(Continued)

(56) References Cited

U.S. PATENT DOCUMENTS

| | | | | |
|---|---|---|---|---|
| 1,776,502 A | * | 9/1930 | Gresley | ................... F16L 13/08 |
| | | | | 285/289.1 |
| 2,577,187 A | * | 12/1951 | Fox | .......................... F16C 33/14 |
| | | | | 29/898.054 |

(Continued)

FOREIGN PATENT DOCUMENTS

| | | |
|---|---|---|
| EP | 3034224 A1 | 6/2016 |
| JP | 60174255 A * | 9/1985 ............... B23K 1/18 |

OTHER PUBLICATIONS

United Kingdom Search Report dated Nov. 29, 2017 issued during the prosecution of United Kingdom Patent Application No. GB1709968.0 (5 pages).

*Primary Examiner* — Kiley S Stoner
(74) *Attorney, Agent, or Firm* — Locke Lord LLP; Joshua L. Jones; Scott D. Wofsy

(57) ABSTRACT

A method of joining includes applying braze to a braze reservoir in a first component. A second component is engaged to the first component, wherein a joint location is defined between the first and second components. A wicking structure provides flow communication from the braze reservoir to the joint location. The method also includes joining the first and second components together at the joint location by applying heat to the braze to flow the braze from the reservoir through the wicking structure to the joint location to form a braze joint at the joint location.

13 Claims, 4 Drawing Sheets

(52) U.S. Cl.
CPC .......... *F05D 2230/237* (2013.01); *F23R 2900/00017* (2013.01); *F23R 2900/00019* (2013.01)

(58) Field of Classification Search
CPC .......... F05D 2230/237; F05D 2220/32; F02M 2200/8084
USPC ................................. 228/204, 258
See application file for complete search history.

(56) References Cited

U.S. PATENT DOCUMENTS

| | | | |
|---|---|---|---|
| 3,501,013 A | 3/1970 | Madsen | |
| 3,665,367 A | 5/1972 | Keller et al. | |
| 3,894,678 A * | 7/1975 | Pietrocini | B22F 7/06 |
| | | | 228/207 |
| 5,065,931 A | 11/1991 | Liu et al. | |
| 5,071,174 A | 12/1991 | Griffin et al. | |
| 5,242,101 A | 9/1993 | Kuchelmeister et al. | |
| 5,301,877 A * | 4/1994 | Madison | B05B 15/65 |
| | | | 239/154 |
| 5,371,944 A * | 12/1994 | Guenther | F02B 23/0603 |
| | | | 123/669 |
| 5,445,312 A | 8/1995 | Francis | |
| 6,604,669 B1 | 8/2003 | Syslak et al. | |
| 7,793,867 B2 * | 9/2010 | Anzinger | C21D 1/78 |
| | | | 239/533.2 |
| 9,511,452 B2 | 12/2016 | Pater et al. | |
| 2004/0178251 A1 | 9/2004 | Trucco | |
| 2009/0140073 A1 * | 6/2009 | Thomson | F23R 3/28 |
| | | | 239/128 |
| 2009/0292337 A1 | 11/2009 | Capcelea et al. | |
| 2011/0059331 A1 | 3/2011 | Smith et al. | |
| 2013/0305730 A1 * | 11/2013 | Donnelly | F02C 7/22 |
| | | | 60/772 |
| 2014/0169957 A1 * | 6/2014 | Kanjiyani | F01D 1/04 |
| | | | 415/202 |
| 2014/0332192 A1 | 11/2014 | Cosby, II et al. | |
| 2015/0260316 A1 | 9/2015 | Mako, Jr. et al. | |
| 2016/0115571 A1 | 4/2016 | Kestler et al. | |
| 2016/0305720 A1 | 10/2016 | Rhee et al. | |
| 2017/0044680 A1 | 2/2017 | Sundaram | |
| 2017/0145848 A1 | 5/2017 | Lewis | |

* cited by examiner

BRAZING COMPONENTS AND TECHNIQUES

CROSS-REFERENCE TO RELATED APPLICATIONS

This application is a divisional of U.S. patent application Ser. No. 15/191,120 filed Jun. 23, 2016, the contents of which are incorporated by reference herein in their entirety.

BACKGROUND OF THE INVENTION

1. Field of the Invention

The present disclosure relates to joining techniques, and more particularly to brazing such as used in joining metallic components.

2. Description of Related Art

Conventional construction of fuel injectors, nozzles, and atomizers includes components bonded together by braze. The components have milled slots or drilled holes to control the flow of fuel and prepare the fuel for atomization. The components are typically nested within one another and form a narrow diametral gap which is filled with a braze alloy. The braze alloy is applied as a braze paste, wire ring, or as a thin sheet shim on the external surfaces or within pockets inside the assembly. The assembly is then heated and the braze alloy melts and flows into the narrow diametral gap and securely bonds the components together upon cooling.

Such conventional methods and systems generally have been considered satisfactory for their intended purpose. However, when using traditional brazing techniques, the braze alloy must flow from a ring or pocket to the braze area. In doing so, it is prone to flow imprecisely when melted. It is also not uncommon for braze fillets to be formed on or in certain features. In some instances intricate or narrow passages can become plugged if too much braze is used. These fillets and plugs can negatively affect nozzle performance. Moreover, braze may not flow to the desired braze area in the quantity needed to ensure a proper braze joint. This is typical when the braze alloy cannot be located in close proximity to the desired braze joint location.

The difficulty in controlling braze flow employing traditional brazing techniques is a limiting factor in the design of fuel and air flow passages within a nozzle. That is, the shape and size of the flow passages is limited by the ability to control the flow of braze.

Such conventional methods and systems have generally been considered satisfactory for their intended purpose. However, there is still a need in the art for improved brazing. The present disclosure provides a solution for this need.

SUMMARY OF THE INVENTION

A method of joining includes applying braze to a braze reservoir in a first component. A second component is engaged to the first component, wherein a joint location is defined between the first and second components. A wicking structure provides flow communication from the braze reservoir to the joint location. The method also includes joining the first and second components together at the joint location by applying heat to the braze to flow the braze from the reservoir through the wicking structure to the joint location to form a braze joint at the joint location.

Engaging the second component to the first component can include engaging the second component to the first component with the wicking structure between the first and second components. The first component can be radially nested with the second component, wherein the wicking structure is radially between the first and second components, and wherein the joint location and the braze reservoir are axially spaced apart.

The first component can include a radial vane, wherein the wicking structure extends radially through the radial vane, and wherein joining the first and second components includes flowing the braze radially outward to the joint location, wherein the joint location is at an end of the radial vane.

There can be a gap between the first and second components on either side of the braze reservoir after the first and second components are engaged, wherein the wicking structure and the joint location are on one side of the braze reservoir, and wherein joining includes flowing the braze into the wicking structure to the joint location leaving the gap on the side of the braze reservoir opposite the wicking structure substantially devoid of braze. It is also contemplated that there can be a gap between the first and second components adjacent the wicking structure when the first and second components are engaged, wherein joining includes flowing the braze into the wicking structure to the joint location leaving the gap substantially devoid of braze.

A nozzle includes a first nozzle component and a second nozzle component joined to the first nozzle component at a joint location. A wicking structure extends from a braze reservoir defined in the first nozzle component to the joint location.

The first and second nozzle components can be radially nested, wherein the wicking structure is radially between the first and second nozzle components, and wherein the joint location and the braze reservoir are axially spaced apart. The wicking structure can be integral with the first nozzle component. The wicking structure can include a repeating pattern, a semi-sintered material, or a woven material. The wicking structure can be additively manufactured, e.g., as part of at least one of the first or second components.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
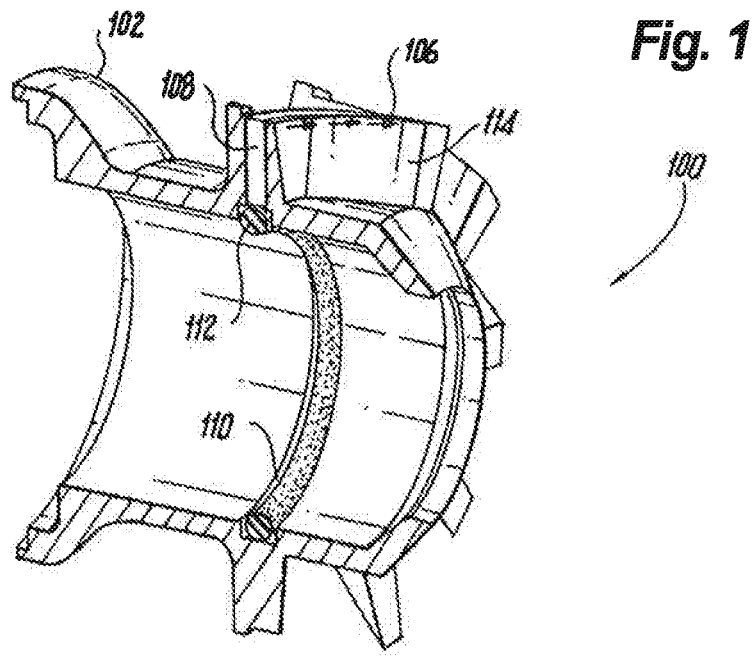
FIG. 1 is a cross-sectional perspective view of an exemplary embodiment of a nozzle component constructed in accordance with the present disclosure, showing a wicking structure extending radially through a swirler vane.

Reference will now be made to the drawings wherein like reference numerals identify similar structural features or aspects of the subject disclosure. For purposes of explanation and illustration, and not limitation, a partial view of an exemplary embodiment of a portion of a nozzle in accordance with the disclosure is shown in FIG. 1 and is designated generally by reference character 100. Other embodiments of nozzles in accordance with the disclosure, or aspects thereof, are provided in FIGS. 2-8, as will be described. The systems and methods described herein can be used to improve control of braze flow when brazing components together.

This disclosure describes techniques in brazing using the exemplary context of joining nozzle components, such as used in gas turbine engines. However, those skilled in the art will readily appreciate that brazing techniques as disclosed herein can be used to join any suitable components without departing from the scope of this disclosure.

A nozzle 100 includes a first nozzle component 102 and a second nozzle component 104 (shown in FIG. 2) joined to the first nozzle component 102 at a joint location 106. A wicking structure 108 extends from a braze reservoir 110 defined in the first nozzle component 102 to the joint location 106. A braze ring 112, braze paste, or any other suitable form of braze is seated in the braze reservoir 110.

Figure 2:
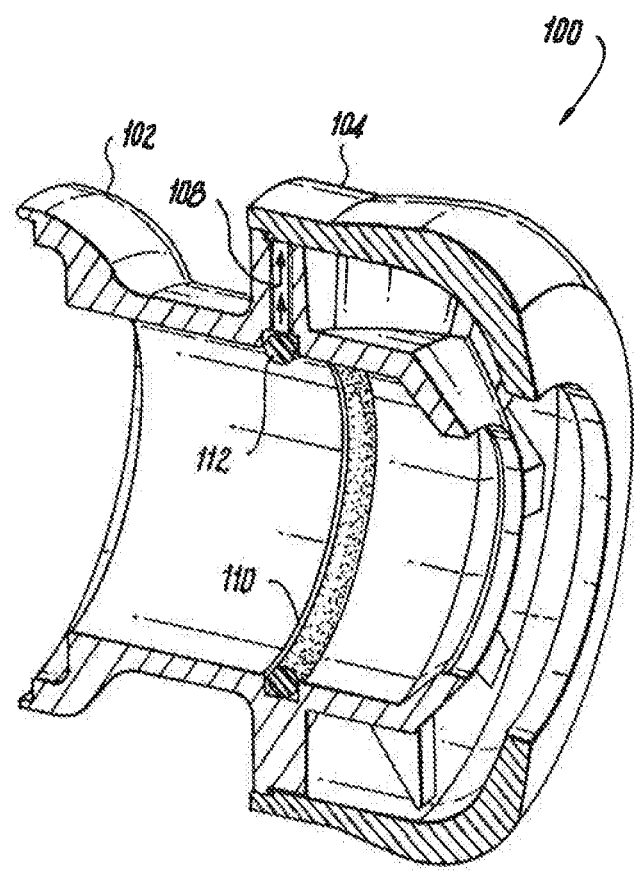
FIG. 2 is a cross-sectional perspective view of the nozzle component of FIG. 1, showing a second nozzle component being joined to the first nozzle component.

Referring now to FIG. 2, the first and second nozzle components 102 and 104 are radially nested when assembled. A method of joining includes applying braze, e.g., braze ring 112 to a braze reservoir, e.g., braze reservoir 110 in a first component, e.g., first component 102. A second component, e.g., second component 104, is engaged to the first component. A joint location, e.g. joint location 106 shown in FIG. 1, is defined between the first and second components. A wicking structure, e.g., wicking structure 108, provides flow communication from the braze reservoir to the joint location. The method also includes joining the first and second components together at the joint location by applying heat to the braze to flow the braze from the reservoir through the wicking structure to the joint location to form a braze joint at the joint location. In FIG. 2, the flow of braze radially outward is indicated by the flow arrows in wicking structure 108, and in FIG. 1, the flow of braze along joint location 106 is indicated by the arrows on joint location 106. In this example, the first component 102 can includes a radial vane 114, wherein the wicking structure 108 extends radially through the radial vane 114. In this example, joining the first and second components 102 and 104 includes flowing the braze radially outward from the braze reservoir 110 to the joint location 106, wherein the joint location 106 is at an end of the radial vane 114. Each vane 114 that requires a braze joint can include a similar wicking structure 108. The wicking structure 108 can remain a part of the final nozzle after the brazing is complete.

Figure 3:
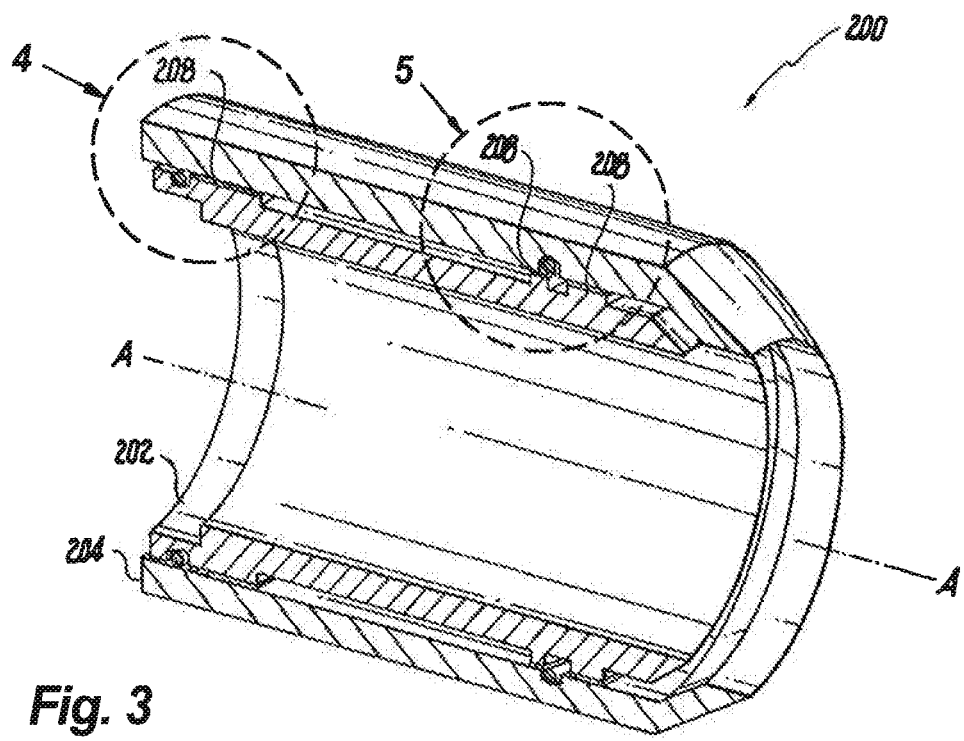
FIG. 3 is a cross-sectional perspective view of a nozzle constructed in accordance with the present disclosure, showing two nozzle components being joined using multiple wicking structures.

With reference now to FIG. 3, another exemplary embodiment of a nozzle 200 is shown with the first component 202 radially nested within the second component 204. Engaging the second component 204 to the first component 202 includes engaging the second component 204 to the first component 202 with the wicking structure 208 between the first and second components 202 and 204. In FIG. 3 there are three wicking structures 208 that are each radially between the first and second nozzle components 202 and 204.

Figure 4:
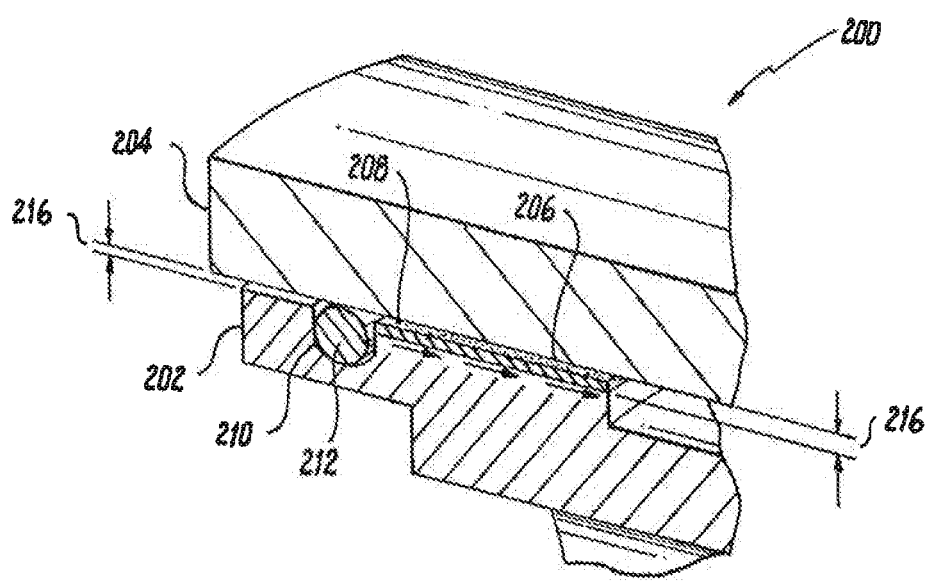
FIG. 4 is a cross-sectional perspective view of a portion of the nozzle of FIG. 3, schematically showing the flow of braze through the wicking structure to a joint location and away from a gap that is intended to be kept clear of braze.
Figure 5:
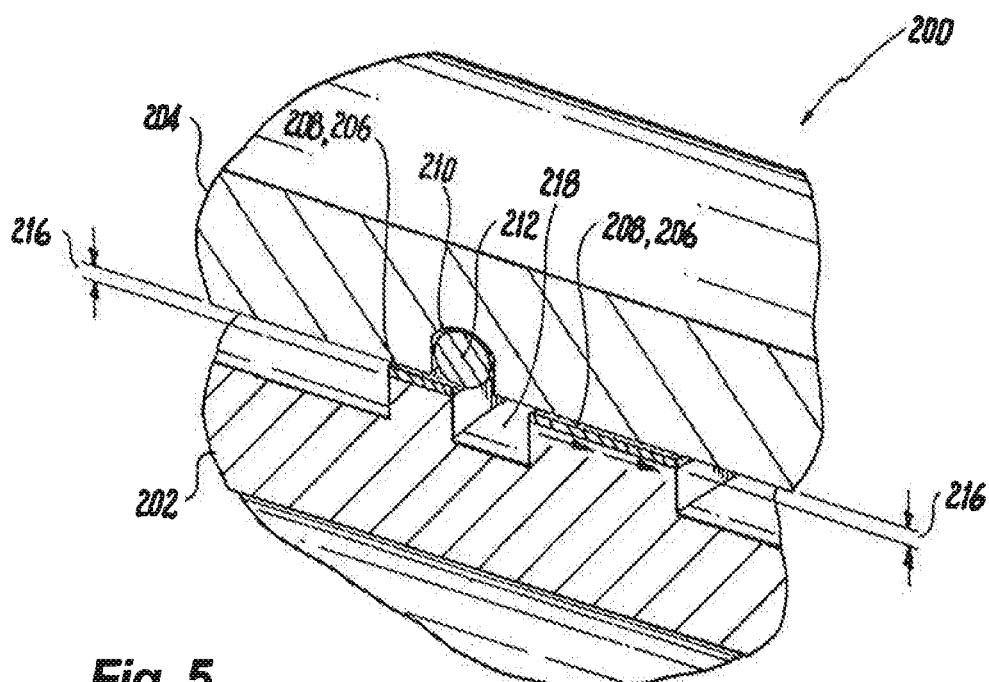
FIG. 5 is a cross-sectional perspective view of a portion of the nozzle of FIG. 3, schematically showing the flow of braze in two wicking structures to joint locations while keeping a flow passage clear of braze.

With reference to FIG. 4, the joint location 206 and the braze reservoir 210 are axially spaced apart, e.g., in the direction of axis A labeled in FIG. 3. After the first and second components 202 and 204 are engaged there is a gap 216 radially between the first and second components 202 and 204 on either side of the braze reservoir 210 axially. Gap 216 can be small, such as 0.001 to 0.002 inches (0.254 mm to 0.508 mm). The wicking structure 208 and the joint location 206 are on one side of the braze reservoir 210 axially. In this example, joining the first and second components 202 and 204 includes flowing the braze 212 into the wicking structure 208 to the joint location 206 leaving the gap 216 on the side of the braze reservoir 210 opposite the wicking structure 208 substantially devoid of braze after the brazing is completed. Referring to FIG. 5, it is also contemplated that there can be a gap 218, e.g., a functional fuel passage in a nozzle that is not to be plugged with braze, between the first and second components 202 and 204 adjacent the two wicking structures 208 when the first and second components 202 and 204 are engaged. In this example, joining the first and second components 202 and 204 includes flowing the braze 212 into the wicking structures 208 to the joint location 208 while leaving the gap 218 substantially devoid of braze. In the example in FIG. 5, the braze reservoir 210 is defined in the second component 204, and the braze flow is indicated schematically in the axial direction for the wicking structure 208 on the right in FIG. 5.

Figure 6:
FIG. 6 is a plan view of an exemplary wicking structure in accordance with the present disclosure, showing a regular, woven pattern.
Figure 7:
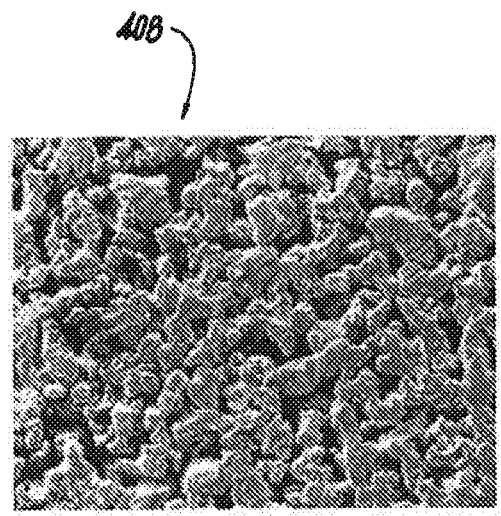
FIG. 7 is a plan view of an exemplary wicking structure in accordance with the present disclosure, showing an irregular, semi-sintered pattern.
Figure 8:
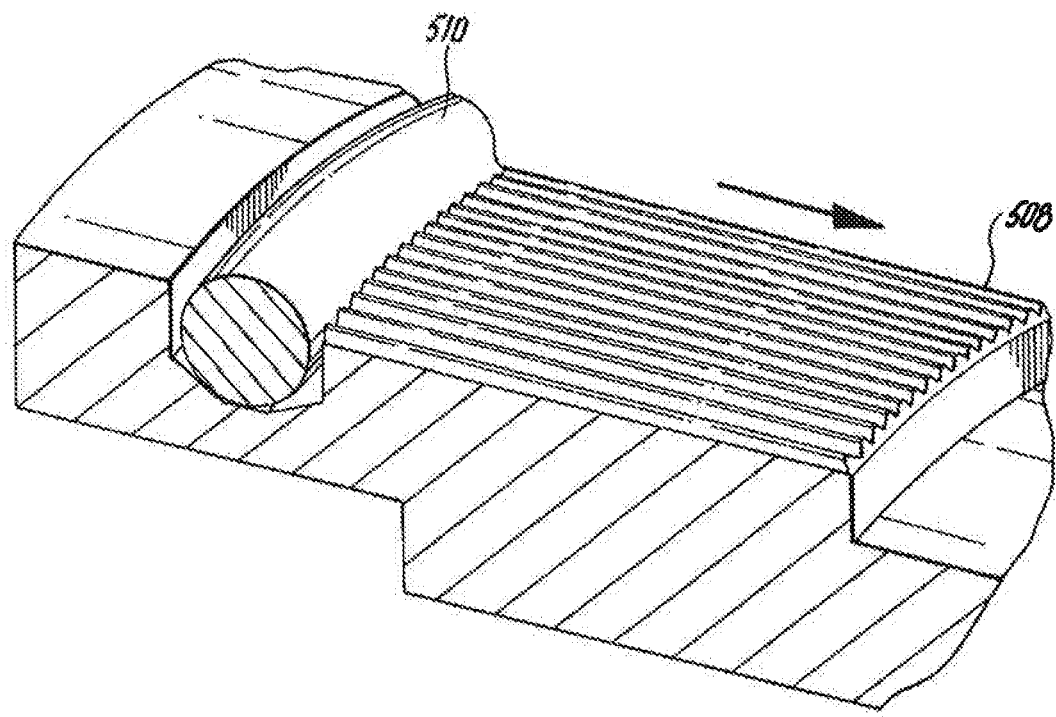
FIG. 8 is a cross-sectional perspective view of an exemplary embodiment of a wicking structure in accordance with the present disclosure, showing a regular, repeating pattern.

With reference now to FIG. 6, the wicking structure 308, which can be used in place of wicking structures 108 or 208, can include a repeating pattern and can be separately manufactured and added to one of the components, e.g., components 202 or 204. The wicking structure 308 includes a weave of metallic wires. In FIG. 7, another exemplary wicking structure 408 is shown, which can be made integral with the first or second nozzle component, e.g., using additive manufacturing. Wicking structure 408 includes a semi-sintered material that forms an irregular or random pattern. FIG. 8 shows another example of a wicking structure 508 that forms a regular, repeating pattern to draw braze 512 in the axial direction indicated by the large arrow in FIG. 8. Those skilled in the art will readily appreciate that any other suitable wicking structure, e.g., a reticulated material, can be used to provide wicking or capillary action for molten braze during the brazing process to convey molten braze to a braze joint location. This provides better control so that braze flows where it is intended to flow, even in intricate parts traditionally too intricate for using braze. It is also possible with systems and methods as disclosed herein to locate the braze reservoir remotely from where the braze joint is located which provides additional design flexibility compared to traditional techniques.

The methods and systems of the present disclosure, as described above and shown in the drawings, provide for brazing with superior properties including improved control over the flow of braze during the brazing process compared to traditional techniques. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of joining comprising:
applying braze to a braze reservoir in a first component;
engaging a second component to the first component, wherein two separate joint locations are defined between the first and second components, wherein two-wicking structures provide flow communication from the braze reservoir to the joint locations;
heating the braze;
flowing the braze from the reservoir through the wicking structures to the joint locations; and
joining the first and second components together,
wherein there is a gap between the first and second components adjacent two separate wicking structures separated from each other by the gap when the first and second components are engaged, wherein joining includes flowing the braze into the wicking structures to the joint location leaving the gap substantially devoid of braze.

2. A method as recited in claim 1, wherein the first component includes a radial vane, wherein the wicking structure extends radially through the radial vane, and wherein joining the first and second components includes flowing the braze radially outward to the joint location, wherein the joint location is at an end of the radial vane.

3. A method as recited in claim 1, wherein there is a gap between the first and second components on either side of the braze reservoir after the first and second components are engaged, wherein the wicking structure and the joint location are on one side of the braze reservoir, and wherein joining includes flowing the braze into the wicking structure to the joint location leaving the gap on the side of the braze reservoir opposite the wicking structure substantially devoid of braze.

4. A nozzle comprising:
a first nozzle component;
a second nozzle component joined to the first nozzle component at a-two separate joint locations; and
two wicking structures extending from a braze reservoir to the joint locations, wherein the braze reservoir is defined in the first nozzle component,
wherein there is a gap between the first and second components adjacent two separate wicking structures separated from each other by the gap when the first and second components are engaged, wherein joining includes flowing the braze into the wicking structures to the joint location leaving the gap substantially devoid of braze.

5. A nozzle as recited in claim 4, wherein the wicking structure and a braze joint are between the first and second nozzle components.

6. A nozzle as recited in claim 4, wherein the first and second nozzle components are radially nested, wherein the wicking structure is radially between the first and second nozzle components, and wherein the joint location and the braze reservoir are axially spaced apart.

7. A nozzle as recited in claim 4, wherein the first nozzle component includes a radial vane, wherein the wicking structure extends radially through the radial vane, and wherein the joint location is at an end of the radial vane.

8. A nozzle as recited in claim 4, wherein there is a gap between the first and second nozzle components on either side of the braze reservoir, wherein the wicking structure and the joint location are on one side of the braze reservoir, and wherein the gap on the side of the braze reservoir opposite the wicking structure is substantially devoid of braze.

9. A nozzle as recited in claim 4, wherein there is a gap between the first and second nozzle components adjacent the wicking structure, wherein the gap is substantially devoid of braze.

10. A nozzle as recited in claim 4, wherein the wicking structure is integral with the first nozzle component.

11. A nozzle as recited in claim 10, wherein the wicking structure includes a repeating pattern.

12. A nozzle as recited in claim 4, wherein the wicking structure includes a semi-sintered material.

13. A nozzle as recited in claim 4, wherein the wicking structure includes a woven material.

* * * * *